Figure 1:
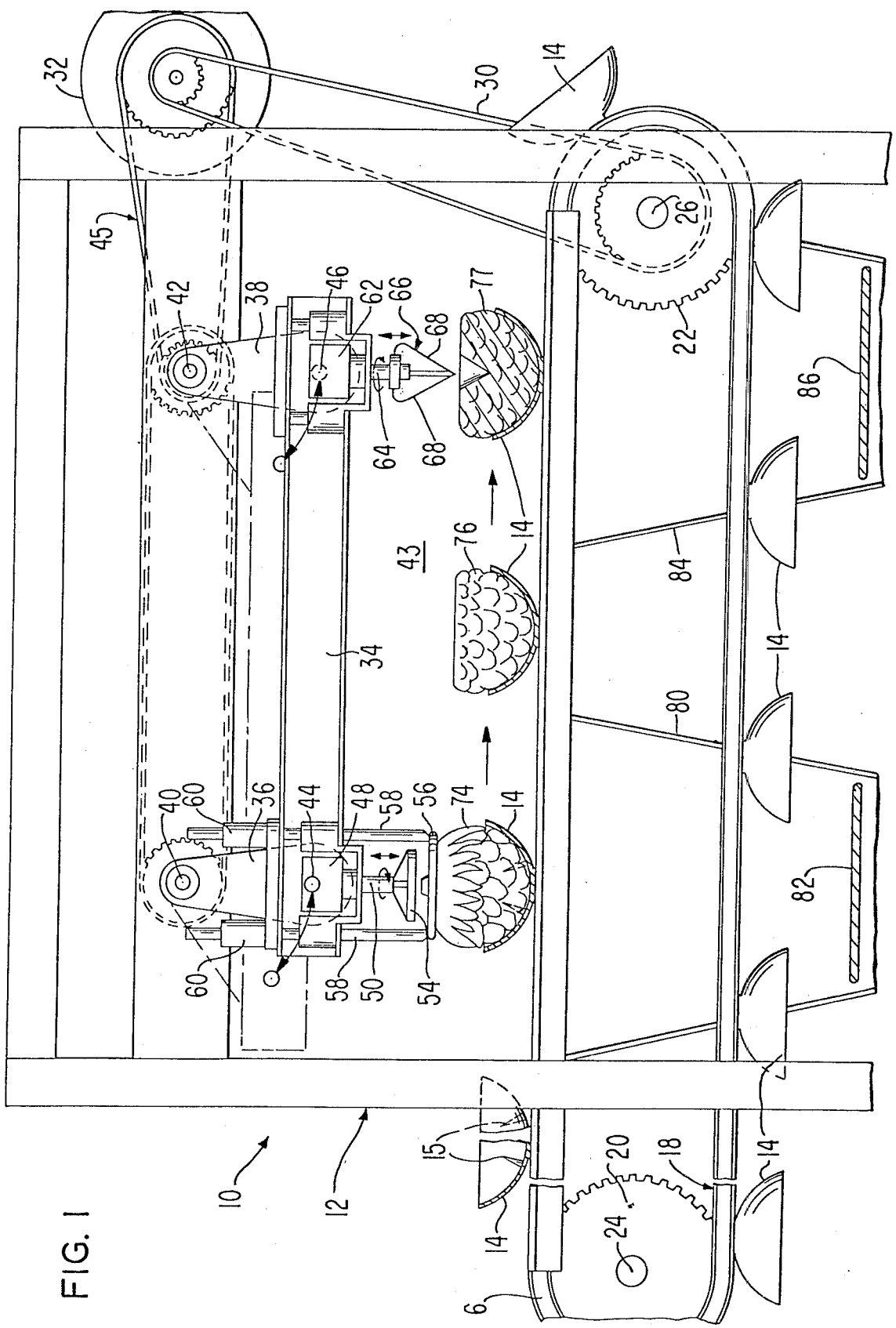

United States Patent [19]

Shaw

[11] 4,241,096
[45] Dec. 23, 1980

[54] METHOD FOR CORING CAULIFLOWER HEADS

[75] Inventor: Richard A. Shaw, Watsonville, Calif.

[73] Assignee: Richard A. Shaw, Inc., Watsonville, Calif.

[21] Appl. No.: 20,897

[22] Filed: Mar. 15, 1979

Related U.S. Application Data

[62] Division of Ser. No. 818,497, Jul. 25, 1977, Pat. No. 4,176,595.

[51] Int. Cl.³ .............................................. A23P 1/00
[52] U.S. Cl. .................................. 426/484; 426/518; 83/404; 83/368
[58] Field of Search ................. 99/537, 538, 542, 544, 99/547, 548, 541, 546, 635, 636, 642, 638, 643, 641; 83/404, 368; 426/484, 481, 518, 482, 809, 615

[56] References Cited

U.S. PATENT DOCUMENTS

| | | | |
|---|---|---|---|
| 3,612,124 | 10/1971 | Cunningham et al. | 99/547 |
| 3,754,470 | 8/1973 | Console | 99/544 |
| 3,886,857 | 6/1975 | Goodale | 99/642 |
| 4,099,456 | 7/1978 | Cornish | 99/638 |

*Primary Examiner*—S. Leon Bashore
*Assistant Examiner*—Michael L. Goldman
*Attorney, Agent, or Firm*—John L. McGannon

[57] ABSTRACT

A cauliflower coring apparatus and method in which cauliflower heads are fed one-by-one into a housing by a conveyor having bowls for receiving the heads, each bowl having a number of spikes on which the heads are impaled. A shiftable beam in the housing carries a first rotary cutter and a vertically adjustable hold-down ring for engaging a head to keep it from moving out of its bowl as the first cutter rotates and removes the culls from the head by a coring effect. After its culls have been removed, the head is engaged and cut by a second rotary cutter which disintegrates the head and separates it into curds. The culls and curds drop into respective first and second chutes and onto first and second conveyors for movement away from the housing.

3 Claims, 2 Drawing Figures

METHOD FOR CORING CAULIFLOWER HEADS

This is a division of application Ser. No. 818,497, filed July 25, 1977 now U.S. Pat. No. 4,176,595.

This invention relates to improvements in the coring of cauliflower heads and, more particularly, to apparatus and a method for removing the culls from cauliflower heads and then breaking the remainder of the head into curds suitable for processing and packaging.

BACKGROUND OF THE INVENTION

Coring of cauliflower heads has been done by machines before. However, conventional machines for this purpose generally use two overlapping horizontal circular blades which sever the butt end or cull portion of the head as the head moves along a predetermined path. Then, with its culls removed, the head is moved into engagement with a rotary knife so that the head is broken into curds which are then collected, process and packaged. The circular blades mentioned above are not adjustable in height and cannot compensate for heads of different sizes. For large heads, the blades must be raised manually so that too much of a relatively large head will not be cut off. Similarly, for smaller heads, the blades have to be manually lowered to get enough of the culls. This requires that the heads be sorted as to size before they are moved through the machine past the blades. This adds to labor costs and to the time required to core a given number of cauliflower heads.

Because of these shortcomings, a need has arisen for an improved apparatus and method for coring cauliflower heads of different sizes without having to change the operating positions of cutting blades yet a relatively large number of cauliflower heads can be cored in a minimum of time.

SUMMARY OF THE INVENTION

The present invention satisfies the aforesaid need by providing apparatus and a method for coring cauliflower heads wherein the heads are received in bowls on a moving conveyor and move into an enclosure where a holder in the form of a ring moves into engagement with each head to hold it as a first cutter severs the culls from the head. This holder is automatically adjustable in height as a function of the size of the head so that it immediately compensates for the size of a cauliflower head even though the head is continuously moving in the enclosure. In this way, the cauliflower head can be quickly cut to remove the culls therefrom and then immediately moved toward and into engagement with a second cutter which disintegrates the head and separates it into curds which are the edible parts of the head. Both the culls and curds fall into respective chutes and are collected on conveyors. The curds are moved to a processing station for packaging.

The primary object of this invention is to provide an improved apparatus and method for coring cauliflower heads, wherein the heads are held in place as the culls are removed therefrom regardless of the sizes of the heads to thereby minimize the time and labor in coring a relatively large number of such heads.

Another object of the present invention is to provide apparatus and a method of the type described, wherein each head is held down by a ring which is biased downwardly and is adjustable in height as a function of the size of the head, yet the ring moves with the head as a first cutter engages and cuts the culls from the head, whereupon the heads with the culls removed are moved to a second station where a second cutter cuts the remainder of the head to separate it into curds which are collected and moved to a processing station.

Other objects of this invention will become apparent as the following specification progresses, reference being had to the accompanying drawings for an illustration of the invention.

IN THE DRAWINGS

Figure 2:
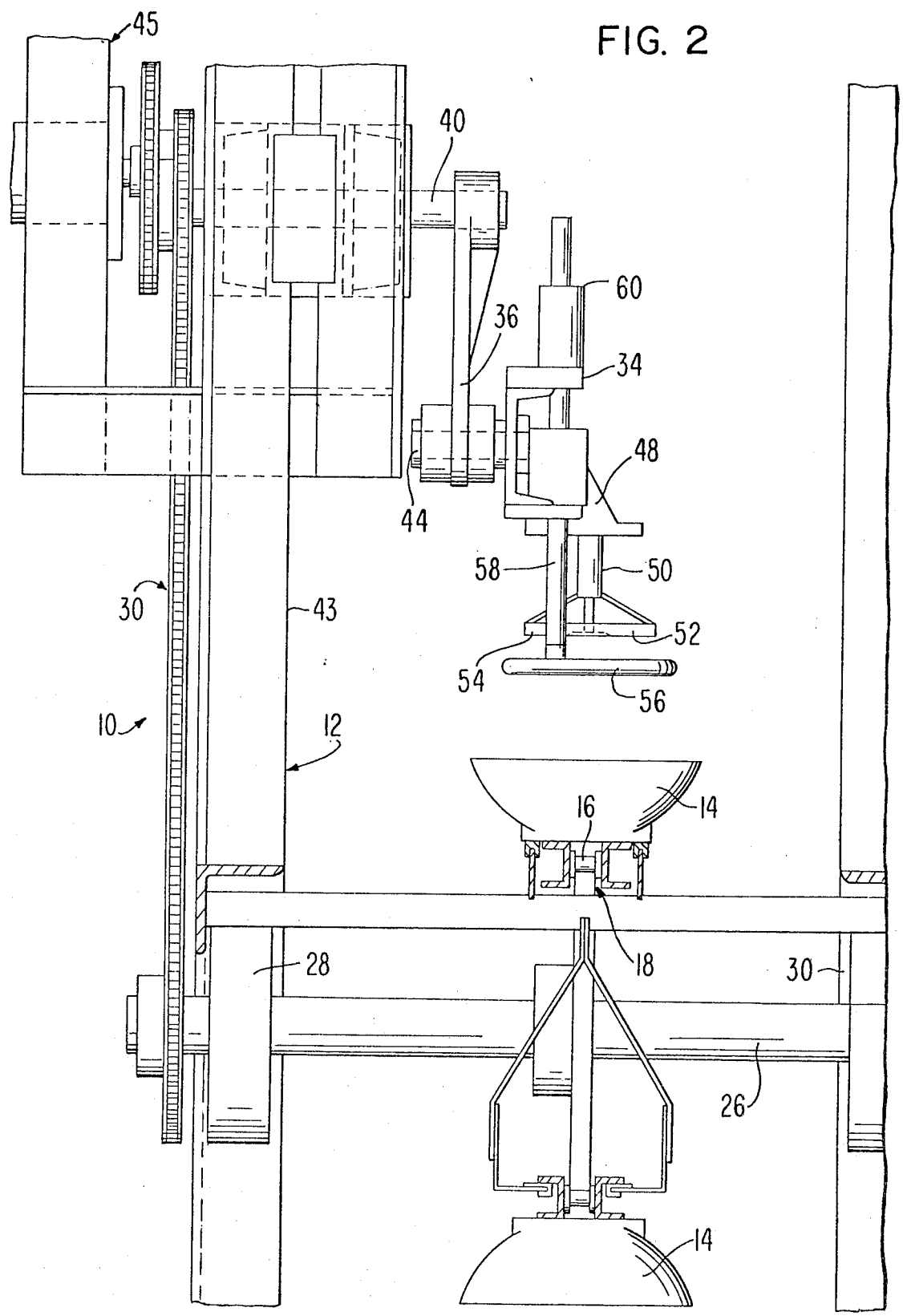

FIG. 1 is a side elevational view of the apparatus for coring cauliflower heads of the present invention; and FIG. 2 is an enlarged, fragmentary, and elevational view of the apparatus.

The apparatus for coring cauliflower heads of the present invention is broadly denoted by the numeral 10 and includes an enclosure or housing 12 mounted on a floor or the like. Typically, housing 12 is at one side of a conveyor belt (not shown) which transports cauliflower heads to the apparatus. The conveyor belt will be at the left-hand end of apparatus 10 when viewing FIG. 1 and will be at a height sufficient to permit a person standing adjacent to the conveyor belt to lift cauliflower heads off the belt and to place them one-by-one in upright bowls 14 carried on an endless, flexible belt or chain 16 of a conveyor 18 movable into and out of housing 12 through one side thereof. The conveyor belt which transports the heads to housing 12 typically extends transversely to conveyor 18.

Bowls 14 are mounted on chain 16 at spaced locations and the bowls have their open tops facing upwardly when the bowls are on the upper stretch of the conveyor chain. On the lower stretch, the bowls face downwardly as they return to the upstream or left-hand end of the conveyor with reference to FIG. 1. Each bowl has a number of spikes 15 secured to its bottom and extending upwardly therefrom. The spikes are used to impale a cauliflower head and hold it against lateral movement in the bowl.

Conveyor 18 includes a pair of end sprockets 20 and 22 mounted on shafts 24 and 26, respectively, for rotation relative to the housing. Shafts 24 and 26 are mounted on suitable supports coupled with housing 12. Typically, such supports include bearings 28 and 30 for each shaft, respectively, the bearings being shown in FIG. 2. The drive means for shaft 26 and thereby conveyor 18 includes a chain and sprocket assembly 30 driven by a motor 32 which may be carried on housing 12 or may be on a suitable support adjacent thereto. Conveyor 18 is operated so that bowls 14 on the upper stretch of the conveyor move from left to right when viewing FIG. 1.

A rigid beam 34 is pivotally mounted on the outer ends of a pair of spaced, rotatable arms 36 and 38. Arms 36 and 38 are mounted for rotation by shafts 40 and 42, respectively, on the stationary rear wall 43 of housing 12, shafts 40 and 42 being rotated in a counterclockwise sense when viewing FIG. 1 by a chain and sprocket assembly 45 coupled with motor 32.

Pins 44 and 46 pivotally connect the outer ends of arms 36 and 38, respectively, to the ends of beam 34 so that, as arms 36 and 38 rotate about the axes of respective shafts 40 and 42, beam 34 moves in an elliptical, rotary motion, i.e., up and down and back and forth. Thus, when beam 34 is at the lowest part of its path of travel, it moves from left to right in a shallow arc when viewing FIG. 1. At the upper end of its path of travel, it moves from right to left in the same arc.

Beam 34 carries a first hydraulic motor 48 at the end thereof adjacent to arm 36. This motor has a rotatable shaft 50 coupled with a radial blade 52 (FIG. 2) forming a first cutter. A guard ring 54, is coupled to and defines the outer boundary of the circular path of travel of blade 52.

A ring 56 generally concentric with guard band 54 is mounted on beam 34 by a pair of diametrically opposed vertical rods 58 which are slidably carried by beam 34 in holes therethrough. The rods are allowed to move up and down with respect to the beam. Each rod 58 has a weight 60 near the upper end thereof for biasing the rod downwardly, the weight being adjustable on the corresponding rod, such as by a set screw or the like, so that a greater or lesser length of the rod can move up and down.

Beam 34 has a second hydraulic motor 62 near the opposite end thereof. Motor 62 has a rotatable drive shaft 64 provided with a second rotary cutter 66 in the form of a pair of cutter blades 68 which converge toward each other as the lower end of cutter 66 is approached so that blades 68 provide a V-shape for cutter 66.

Motors 48 and 62 are provided with fluid lines (not shown) coupled with a source of hydraulic fluid under pressure. The motors are driven at relatively high speeds so that the first and second cutters operate at high rotary speeds.

In operation, cauliflower heads are placed in each bowl 14 as it moves about shaft 24, the root or cull part of the head being disposed upwardly and the curd or edible part of the head being impaled on spikes 15. Conveyor 18 moves continuously and beam 34 is synchronized with the conveyor so that, as a head 74 (FIG. 1) moves into housing 12, ring 56 and cutter blade 52 start to descend. As ring 56 meets head 74 and engages the same, the ring holds the head from coming out of the bowl as blade 52 cuts the head and removes the culls therefrom, leaving only the curds or the edible part of the head. Head 76 in FIG. 2 is shown after it has moved away from blade 52 and ring 56 and has had the culls removed therefrom.

As head 74 moves beneath ring 56, the latter adjusts its height as a function of a size of the head. For instance, for a large head, the ring will be forced upwardly relative to beam 34 and rods 58 will move through the respective holes in beam 34 against the bias force of weight 60 until the ring fits properly on the head to hold it while blade 52 cuts the culls from the head. For a small or medium head, the ring will be at its lowest point or intermediate points. In all cases, the ring will follow the head for at least a distance sufficient to permit blade 52 to cut the culls from the head. Blade 52 and ring 56 will be essentially moving along a straight line during this time although, in actuality, they will be moving in respective arcs due to the way in which beam 34 is connected to arms 36 and 38. However, the time necessary for blade 52 to do its work of cutting the culls is relatively short and is sufficient to assure the proper cutting of the head to remove the culls therefrom.

As the culls are removed from the head, they fall into a chute 80 below the location at which blade 52 engages the heads. These culls then fall onto a conveyor 82 moving transversely to conveyor 18 and are transferred to a collection station.

As the head with the culls removed advances to the right in FIG. 2, it eventually moves into alignment with cutter 66 as this cutter moves downwardly. When the cutter engages the head, it applies a rotary cutting action to the head, breaking it into a number of curds, such as 6 to 12 curds, which fall into a second chute 84 and are deposited on a conveyor 86 for movement to another collection station. For purposes of illustration, cutter 66 is shown elevated above head 77 therebelow; however, in practice, cutter 66 would be in the dashed line position of FIG. 1 when the cutter is vertically aligned with head 77. Again, the cutting action of cutters 66 is sufficiently rapid so that the head is disintegrated into the separated curds in a fraction of a second so that, although cutter 66 is, in actuality, moving in a rotary arc, it is moving in a straight line for purposes of cutting head 77 into the curds.

The operation of apparatus 10 will continue so long as heads are manually placed in bowls 14. During the cutting operation, housing 12 is enclosed because considerable debris is flung in all directions, such as against the back of the housing as well as the front. Typically, the front is made of plastic doors (not shown) which can be swingable to permit access to the interior of the housing for maintenance and the like.

I claim:

1. A method of coring cauliflower heads having culls comprising: moving a plurality of cauliflower heads along a predetermined path with the base of each head extending upwardly; cutting the culls from the base of each head as it moves along a first part of said path; exerting downward forces on each head through a zone extending circumferentially of the head to hold the head against movement out of said path as the head moves along said first part of the path and as the culls are cut from the base of each head; removing the force from each head after the culls have been cut therefrom; cutting each head as the latter moves along a second part of said path after said force has been removed to cause the head to break up into parts; and collecting the culls and the parts at separate locations.

2. A method as set forth in claim 1, wherein the zone of application of the holding forces of each head varies in height relative to a predetermined reference as a function of the size of the head.

3. A method as set forth in claim 2, wherein said zone is circular, said step of cutting said culls including applying a first rotary cutting action to the base of each head within said zone, said step of cutting the head including applying a second rotary cutting action to the head.

* * * * *